(12) United States Patent
Zhou et al.

(10) Patent No.: US 10,936,162 B2
(45) Date of Patent: Mar. 2, 2021

(54) METHOD AND DEVICE FOR AUGMENTED REALITY AND VIRTUAL REALITY DISPLAY

(71) Applicant: LENOVO (BEIJING) LIMITED, Beijing (CN)

(72) Inventors: Yun Zhou, Beijing (CN); Wenjun Lu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 16/487,357

(22) PCT Filed: Sep. 22, 2017

(86) PCT No.: PCT/CN2017/102941
§ 371 (c)(1),
(2) Date: Aug. 20, 2019

(87) PCT Pub. No.: WO2018/153081
PCT Pub. Date: Aug. 30, 2018

(65) Prior Publication Data
US 2019/0377464 A1    Dec. 12, 2019

(30) Foreign Application Priority Data
Feb. 21, 2017  (CN) .......................... 201710092737.4

(51) Int. Cl.
*G06F 3/0482* (2013.01)
*G02B 27/01* (2006.01)
(Continued)

(52) U.S. Cl.
CPC .......... *G06F 3/0482* (2013.01); *G02B 27/017* (2013.01); *G06F 3/017* (2013.01); *G06F 3/04883* (2013.01); *G02B 2027/0178* (2013.01)

(58) Field of Classification Search
CPC ..... G06F 3/017; G06F 3/0482; G02B 27/017; G02B 2027/0178; G06K 9/00671
See application file for complete search history.

(56) References Cited

U.S. PATENT DOCUMENTS 10,602,133 B2 * 3/2020 Valdivia .................. G06F 3/017
2012/0113223 A1 * 5/2012 Hilliges .............. G06F 3/04815
                                                                    348/46
(Continued)

FOREIGN PATENT DOCUMENTS

CN           103018905 A     4/2013
CN           104345457 A     2/2015
(Continued)

OTHER PUBLICATIONS

The World Intellectual Property Organization (WIPO) International Search Report for PCT/CN2017/102941 dated Dec. 20, 2017 5 Pages (including translation).

*Primary Examiner* — Dino Kujundzic
(74) *Attorney, Agent, or Firm* — Anova Law Group, PLLC (57) ABSTRACT

A display method and an electronic device are provided to improve operation efficiency and to reduce probability of blocking a user's observation of an object when displaying a function menu. The display method includes: acquiring object information within a viewing range of a user; based on the object information, determining that a first real object is within the viewing range of the user; outputting an image of the function menu of the electronic device to make the user perceive the function menu being displayed on the first real object; and if the it is determined that the first real object leaves the viewing range of the user, terminating outputting the image of the function menu.

10 Claims, 6 Drawing Sheets

(51) Int. Cl.
*G06F 3/01* (2006.01)
*G06F 3/0488* (2013.01)

(56) References Cited

U.S. PATENT DOCUMENTS

| | | | |
|---|---|---|---|
| 2013/0246967 A1* | 9/2013 | Wheeler | G02B 27/0093 |
| | | | 715/784 |
| 2014/0184475 A1* | 7/2014 | Tantos | H04N 21/234345 |
| | | | 345/8 |
| 2014/0282162 A1 | 9/2014 | Fein et al. | |
| 2015/0035728 A1 | 2/2015 | Kobayashi | |
| 2016/0026253 A1* | 1/2016 | Bradski | G02B 27/0172 |
| | | | 345/8 |
| 2016/0054791 A1* | 2/2016 | Mullins | G04G 21/00 |
| | | | 345/173 |
| 2016/0071320 A1* | 3/2016 | Smith | G06T 19/006 |
| | | | 345/633 |
| 2017/0242479 A1* | 8/2017 | Moravetz | G02B 27/017 |
| 2017/0337897 A1* | 11/2017 | Jung | G06F 3/012 |

FOREIGN PATENT DOCUMENTS

| | | | | |
|---|---|---|---|---|
| CN | 105229588 A | | 1/2016 | |
| CN | 105339870 A | | 2/2016 | |
| CN | 105630148 A | | 6/2016 | |
| CN | 106951153 A | | 7/2017 | |
| GB | 2495159 A | * | 4/2013 | ........... G06F 3/0304 |
| WO | 2015192117 A1 | | 12/2015 | |

* cited by examiner

METHOD AND DEVICE FOR AUGMENTED REALITY AND VIRTUAL REALITY DISPLAY

CROSS-REFERENCES TO RELATED APPLICATIONS

This application is a national phase entry under 35 U.S.C. § 371 of International Application No. PCT/CN2017/102941, filed on Sep. 22, 2017, which claims the priority of Chinese Patent Application No. 201710092737.4, filed with the State Intellectual Property Office of P. R. China on Feb. 21, 2017, the entire contents of which are incorporated herein by reference.

FIELD OF THE DISCLOSURE

The present disclosure generally relates to the field of image display technology and, more particularly, relates to a display method and an electronic device.

BACKGROUND

By using augmented reality (AR) glasses, a user can view real-world and virtual images simultaneously. In the existing technology, after a desktop launcher is started, an interface of the desktop launcher may be displayed on a real object that the user observes, thereby blocking the user's view and affect the user's observation of the real-world. The interface of the desktop launcher may be displayed outside the user's current viewing range and may not be readily seen, thereby affecting operation efficiency.

The disclosed display method and electronic device are directed to solve one or more problems set forth above and other problems in the art.

BRIEF SUMMARY OF THE DISCLOSURE

The present disclosure provides a display method and an electronic device to improve operation efficiency and to reduce probability of blocking the user's observation of an object when displaying a function menu.

One aspect of the present disclosure provides a display method, being applied to an electronic device. The method includes: acquiring object information within a viewing range of a user; based on the object information, determining that a first real object is within the viewing range of the user; outputting an image of a function menu of the electronic device to make the user perceive the function menu being displayed on the first real object; and if the it is determined that the first real object leaves the viewing range of the user, terminating outputting the image of the function menu.

Optionally, the first real object is a palm. Acquiring the object information within the viewing range of the user includes acquiring a first gesture. Determining that the first real object is within the viewing range of the user based on the object information includes: if the first gesture is a gesture of bending and extending a finger toward the electronic device, determining that the first real object is within the viewing range of the user.

Optionally, after outputting the image of the function menu of the electronic device, the method further includes: acquiring a first operation on the function menu, wherein the first operation triggers a first interactive object in the function menu; and reducing a display area of the function menu and/or concealing a portion of the content of the function menu.

Optionally, after outputting the image of the function menu of the electronic device, the method further includes: acquiring the first operation on the function menu, wherein the first operation triggers the first interactive object in the function menu; and outputting an image of a control menu to make the user perceive the control menu being displayed on the first real object, wherein the control menu is different from the function menu and the control menu includes control elements through which the user performs the operation on the content corresponding to the first interactive object.

Optionally, after outputting the image of the function menu of the electronic device, the method further includes: determining whether the first real object needs to be used for a gesture control; and reducing the display area of the function menu and/or concealing a portion of the content of the function menu.

Optionally, before outputting the image of the function menu of the electronic device, the method further includes: determining a focal point of a line of sight of the user; and outputting the image of the function menu of the electronic device to make the user perceive the function menu being displayed on the first real object includes: if the focal point is located on the first real object, outputting the image of the function menu to make the user perceive the function menu being displayed on the first real object.

Another aspect of the present disclosure provides an electronic device. The electronic device includes: an image acquisition unit configured to acquire object information within a viewing range of a user; a memory configured to store instructions; a processor configured to determine that the first real object is within the viewing range of the user based on the object information; and an image output unit configured to output an image of a function menu of the electronic device to make the user perceive the function menu being displayed on the first real object, and if the processor determines that the first real object leaves the viewing range of the user, to terminate outputting the image of the function menu.

Optionally, the first real object is a palm. Acquiring the object information within the viewing range of the user by the image acquisition unit includes: acquiring a first gesture. Determining that the first real object is within the viewing range of the user based on the object information by the processor includes: if the first gesture is a gesture of bending and extending a finger toward the electronic device, determining that the first real object is within the viewing range of the user.

Optionally, after the image output unit outputs the image of the function menu of the electronic device, the processor is further configured to acquire a first operation on the function menu, wherein the first operation triggers a first interactive object in the function menu, and the image output unit is further configured to reduce a display area of the function menu and/or concealing a portion of the content of the function menu.

Optionally, after the image output unit outputs the image of the function menu of the electronic device, the processor is further configured to acquire the first operation on the function menu, wherein the first operation triggers a first interactive object in the function menu, and the image output unit is further configured to output an image of a control menu to make the user perceive the control menu being displayed on the first real object, wherein the control menu is different from the function menu and the control menu includes control elements through which the user performs the operation on the content corresponding to the first interactive object.

Optionally, after the image output unit outputs the image of the function menu of the electronic device, the processor is further configured to determine whether the first real object needs to be used for a gesture control, and the image output unit is further configured to reduce the display area of the function menu and/or concealing a portion of the content of the function menu.

Optionally, before the image output unit outputs the image of the function menu of the electronic device, the processor is further configured to determine a focal point of a line of sight of the user. Outputting, by the image output unit, the image of the function menu of the electronic device to make the user perceive the function menu being displayed on the first real object includes: if the focal point is located on the first real object, outputting, by the image output unit, the image of the function menu to make the user perceive the function menu being displayed on the first real object.

Another aspect of the present disclosure provides an electronic device. The electronic device includes: an acquisition module configured to acquire object information within a viewing range of a user; a determination module configured to determine that the first real object is within the viewing range of the user based on the object information; and an output module configured to output an image of a function menu of the electronic device to make the user perceive the function menu being displayed on the first real object, and if the determination module determines that the first real object leaves the viewing range of the user, to terminate outputting the image of the function menu.

Optionally, the first real object is a palm. Acquiring the object information within the viewing range of the user by the acquisition module includes: acquiring a first gesture. Determining that the first real object is within the viewing range of the user based on the object information by the determination module includes: if the first gesture is a gesture of bending and extending a finger toward the electronic device, determining that the first real object is within the viewing range of the user.

Optionally, after the output module outputs the image of the function menu of the electronic device, the acquisition module is further configured to acquire a first operation on the function menu, wherein the first operation triggers a first interactive object in the function menu, and the output module is further configured to reduce a display area of the function menu and/or concealing a portion of the content of the function menu.

Optionally, after the output module outputs the image of the function menu of the electronic device, the acquisition module is further configured to acquire the first operation on the function menu, wherein the first operation triggers a first interactive object in the function menu, and the output module is further configured to output an image of a control menu to make the user perceive the control menu being displayed on the first real object, wherein the control menu is different from the function menu and the control menu includes control elements through which the user performs the operation on the content corresponding to the first interactive object.

Optionally, after the output module outputs the image of the function menu of the electronic device, the determination module is further configured to determine whether the first real object needs to be used for a gesture control, and the output module is further configured to reduce the display area of the function menu and/or concealing a portion of the content of the function menu.

Optionally, before the output module outputs the image of the function menu of the electronic device, the determination module is further configured to determine a focal point of a line of sight of the user, and outputting, by the output module, the image of the function menu of the electronic device to make the user perceive the function menu being displayed on the first real object includes: if the focal point is located on the first real object, outputting, by the output module, the image of the function menu to make the user perceive the function menu being displayed on the first real object.

The present disclosure provides the display method and the electronic device. From the user's perspective, the operation of opening the function menu or the operation of concealing the function menu is as simple as making the first real object enter or leave the viewing range of the user. It is convenient and easy to use. The user perceives the function menu being displayed on a pre-set first real object rather than being displayed on any real object within the viewing range of the user. Thus, the probability of interfering with the user's observation of the object desired to be observed is substantially reduced. It is convenient for the user to quickly find the function menu, thereby improving the operation efficiency.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

In addition, the term "and/or" herein is merely an association relationship describing an associated object, indicting that there may be three relationships. For example, A and/or B may represent three cases of A alone, B alone, and both A and B. Further, the character "/" generally indicates that associated objects in the context have an "or" relationship unless otherwise specified.

In one embodiment, an electronic device may include AR glasses, head-mounted display device, and a projection device, etc. The embodiments of the present disclosure do not limit specific type of the electronic device.

For better comprehension of the present disclosure, the technical solutions provided by the embodiments of the present disclosure are described below with reference to the accompanying drawings.

Figure 1:
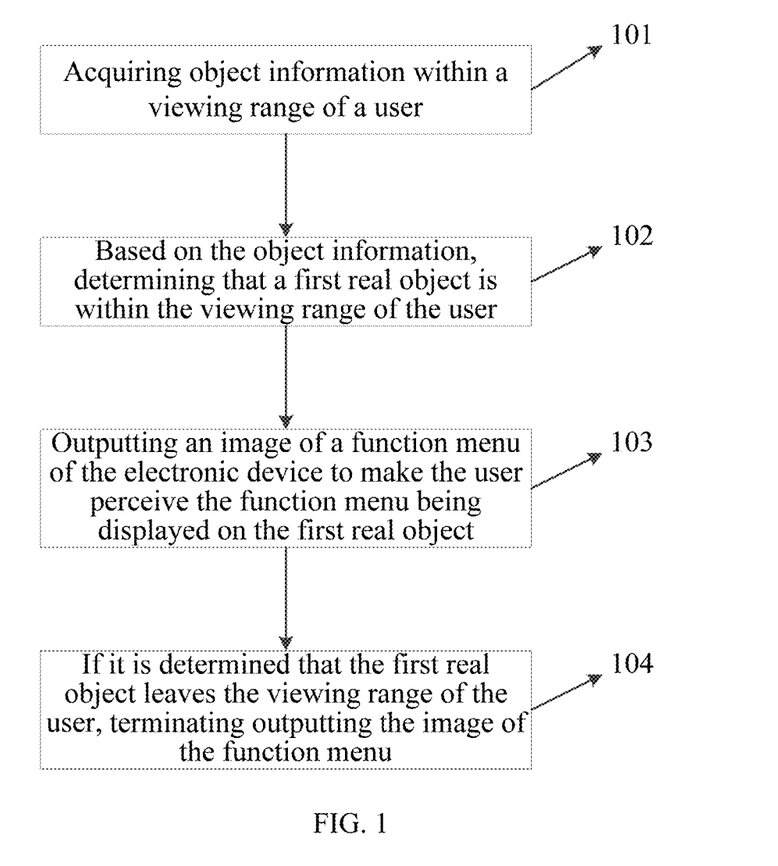
FIG. 1 illustrates a flowchart of an example of a display method according to some embodiments of the present disclosure.
Figure 2:
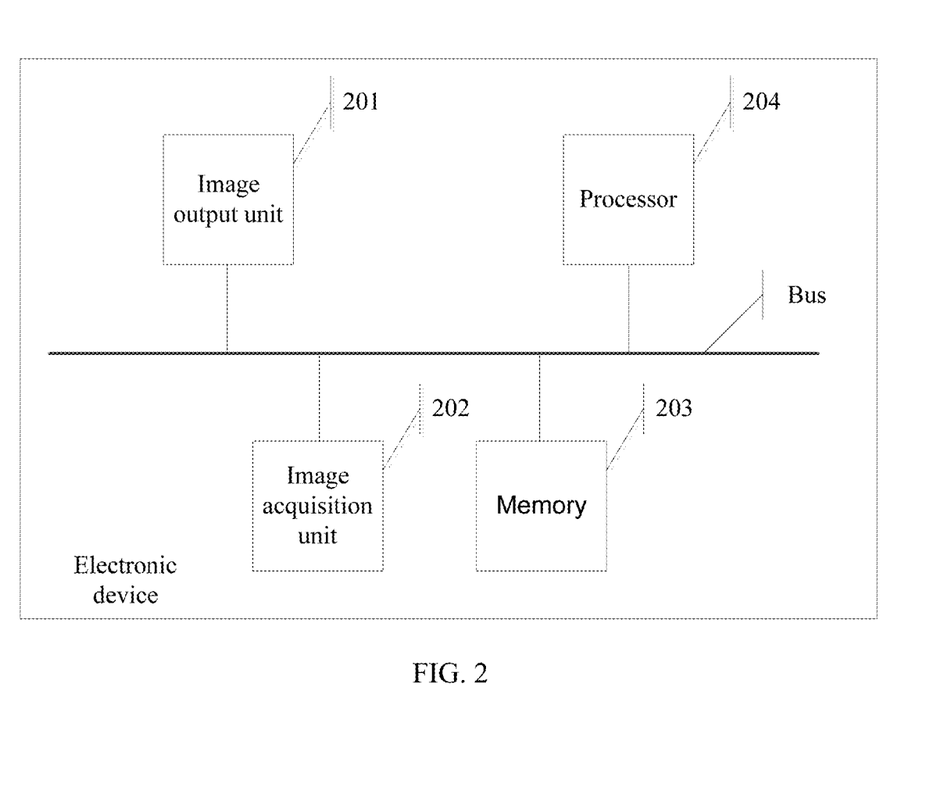
FIG. 2 illustrates a block diagram of an example of an electronic device according to some embodiments of the present disclosure.

FIG. 1 illustrates a flowchart of an example of a display method according to some embodiments of the present disclosure. FIG. 2 illustrates a block diagram of an example of an electronic device according to some embodiments of the present disclosure. The electronic device may be configured to perform steps of the display method shown in FIG. 1. As shown in FIG. 1, the method includes the following steps.

Step 101: acquiring object information within a viewing range of a user.

Step 102: based on the object information, determining that a first real object is within the viewing range of the user.

Step 103: outputting an image of a function menu of the electronic device to make the user perceive the function menu being displayed on the first real object.

Step 104: if it is determined that the first real object leaves the viewing range of the user, terminating outputting the image of the function menu.

In one embodiment, as shown in FIG. 2, the electronic device includes an image output unit 201. The image output unit 201 is configured to output an image. In some embodiments, the image output unit 201 may be configured to generate the image, which is not limited by the present disclosure. In a process of using the image output unit 201, the user may see objects in the real-world and the image outputted by the image output unit 201.

For example, if the electronic device is the AR glasses, the image output unit 201 may include a component on the AR glasses to generate and/or output the image, such as a liquid crystal display (LCD), a light emitting diode (LED) display unit, a cathode ray tube (CRT), and a laser projection device, etc. If the electronic device is an ordinary projection device, the image output unit 201 may include a component to output a projection image. The type of the image output unit 201 is not limited by the embodiments of the present disclosure.

The function menu in the embodiments of the present disclosure may include, but is not limited to, an interface of the desktop launcher. The desktop launcher is a special application program. After the electronic device is started, the interface the user will see is the desktop launcher, that is, the interface of the desktop launcher often includes a home screen of the electronic device. The interface of the desktop launcher may output electronic device parameters such as time and battery power, etc., current system parameter settings (e.g., brightness adjustment and volume adjustment), and an application list, etc. The present disclosure does not limit contents included in the interface of the desktop launcher. In one embodiment, the desktop launcher includes, but is not limited to, a desktop launcher of Android operating system, and equivalent function application programs of other operating systems (e.g., Apple iPhone operating system IOS).

In one embodiment, if the first real object is not within the viewing range of the user, the electronic device does not output the image of the function menu. As such, the interferences caused by the image of the function menu to the user viewing real objects or other virtual objects (i.e., the image outputted by the image output unit 201) other than the image of the function menu may be prevented, and the power consumption of the electronic device may be saved.

Figure 3A:
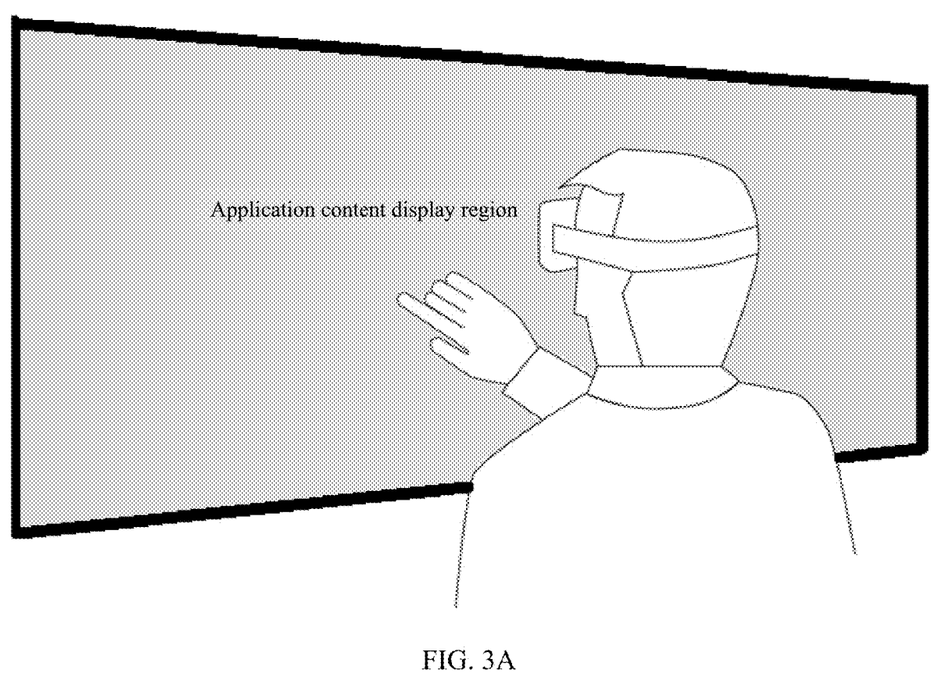
FIG. 3A illustrates an application scenario of an example of the electronic device according to some embodiments of the present disclosure.

FIG. 3A illustrates an application scenario of an example of the electronic device according to some embodiments of the present disclosure. As shown in FIG. 3A, the electronic device is the AR glasses. The electronic device is outputting the image of an application interface through the image output unit 201. The user uses the right hand to perform operations in a display region (i.e., an application content display region in FIG. 3A) of the application interface. The first real object is, for example, the left-hand wrist of the user. In this case, the left hand of the user is not within the viewing range of the user. Thus, the function menu is not displayed to avoid interfering with the user's operation of the application.

In one embodiment, if the user desires to open the function menu, the operation that the user needs to perform is simple, that is, making the first real object appear within the viewing range of the user.

In some embodiments, the first real object may be a certain body part of the user, such as a wrist, a palm, and an arm, etc., or may be a pre-determined object. The type of the first real object is not limited by the embodiments of the present disclosure.

To achieve a better technical effect, the first real object is preferably a real-world object that the user does not normally observe when using the electronic device, such that degradation of the user's viewing experience of the electronic device may be avoided. In the process of selecting the first real object, a substantial amount of usage habit data for the AR device by users may be collected to determine the real object that the users seldom observe during the use of the AR device in various application scenarios. Alternatively, the user may configure a preferred object as the first real object on the electronic device. Further, the first real object may be a purpose-made product matching the electronic device. The embodiments of the present disclosure do not limit the type of the first real object.

As shown in FIG. 2, the electronic device further includes an image acquisition unit 202, a memory 203 configured to store instructions, and a processor 204 configured to execute the instruction stored in the memory 203. The image output unit 201, the image acquisition unit 202, and the memory 203 may be respectively connected to the processor 204 through dedicated connection lines. Alternatively, the image output unit 201, the image acquisition unit 202, and the memory 204 may be connected to the processor 204 through buses. For illustrative purposes, the image output unit 201, the image acquisition unit 202, and the memory 203 are connected to the processor 204 through the buses as shown in FIG. 2.

The memory 203 may include one or more memories. The memory 203 may include a read-only memory (ROM), a random-access memory (RAM), or a magnetic disk memory. The processor 204 may include a general-purpose central processing unit (CPU), an application specific integrated circuit (ASIC), or one or more integrated circuits configured to control execution of the instructions.

The image acquisition unit 202 may be configured to acquire object information within the viewing range of the user and to send the acquired object information to the processor 204. For example, the image acquisition unit 202 may be a depth camera, which is not limited by the embodiments of the present disclosure.

The processor 204 may received the object information acquired by the image acquisition unit 202. After the processor 204 processes the object information and determines that the first real object is within the viewing range of the user based on a certain algorithm, the processor 204 may control the image output unit 201 to output the image of the function menu to make the user perceive the function menu being display on the first real object.

In some embodiments, the image output unit 201 outputs the image of the function menu to make the user perceive the function menu being displayed on the first real object. There are two approaches of the implementation.

In one approach, the electronic device may also include a reflection unit, such as an eyepiece and a beam splitter, etc. The image output unit 201 outputs the image of the function menu and the reflection unit reflects the image of the function menu outputted by the image output unit 201 to user's eyes, such that the user perceives (e.g., through the reflection unit) the function menu being displayed on the first real object.

If the image output unit 201 is an image output component of the AR glasses, making the user perceive the function menu being displayed on the first real object may include: adjusting an object distance of a virtual image of the image of the function menu relative to the user's eyes to be equal to a focal length of the user's eyes viewing the first real object. The related technology is the existing technology and will not be repeated herein.

Figure 3B:
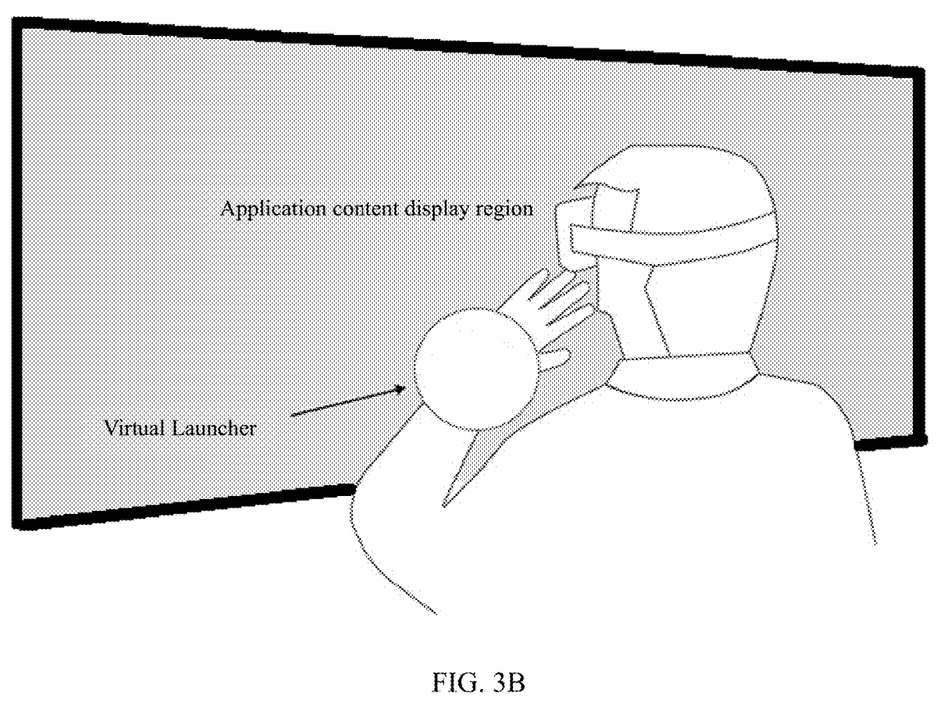
FIG. 3B illustrates a schematic view of an example of a function menu of the electronic device making a user perceive the function menu being displayed on a first real object according to some embodiments of the present disclosure.

FIG. 3B illustrates a schematic view of an example of a function menu of the electronic device making a user perceive the function menu being displayed on the first real object according to some embodiments of the present disclosure. In one embodiment, the image output unit 201 is the image output component of the AR glasses, the first real object is the left-hand wrist, the image acquisition unit 202 is the depth camera, and the function menu is the interface of the launcher. The electronic device includes a transmitting unit. The reflection unit is a reflective lens. After the processor 204 processes the image acquired by the image acquisition unit 202, it is determined that the left-hand wrist appears within the viewing range seen by the user through the reflection unit. The processor 204 controls the image output unit 201 to output the image of the interface of the launcher and to reflect the image to the user's retina through the reflection unit. The user sees the virtual image of the image of the interface of the launcher being displayed on the user's left-hand wrist.

In another approach, the image output unit 201 projects and displays the image of the function menu on the first real object through, for example, projection.

Both approaches facilitate the user to conveniently view the image of the function menu (the image of the function menu is seen by the user superimposing on the first real object) without looking around. Further, the first real object can be configured to be the real object that the user seldom observes during the use of the electronic device. At the same time, virtual objects other than the image of the function menu may be configured not to be displayed on the first real object as seen by the user. Thus, neither approaches may interfere with the user's viewing of the real-world or operating on other applications.

In some embodiments, the image of the function menu moves along with the first real object and as long as the first real object appears within the viewing range of the user, the user can see the image of the function menu being displayed on the first real object.

In some embodiments, in response to the determination by the processor 204 that the first real object (e.g., the entire wrist) appears within the viewing range of the user, the processor 204 controls the image output unit 201 to output the image of the function menu. As such, the probability that incorrect responses by the electronic device in response to a unintentional partial appearance of the first real object within the viewing range of the user may be reduced and at the same time, displaying the entire function menu on the first real object may be ensured.

In some embodiments, the first real object may be the palm. Acquiring the object information within the viewing range of the user by the image acquisition unit 202 may include: acquiring a first gesture.

Determining by the processor 204 that the first real object is within the viewing range of the user based on the object information may include: if the first gesture is a gesture of a finger bending and extending toward the electronic device, determining that the first real object is within the viewing range of the user.

Figure 4A:
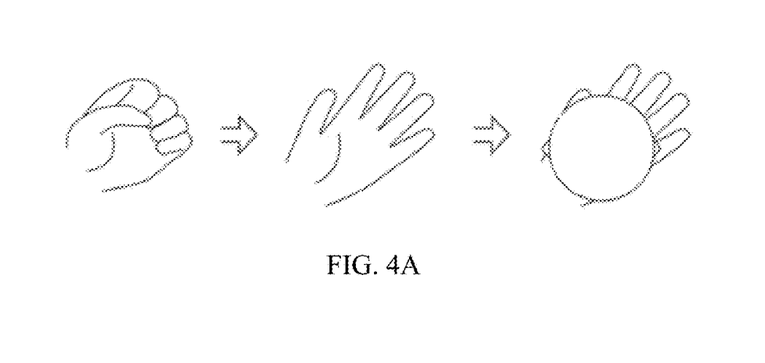
FIG. 4A illustrates a schematic view of an example of the first real object in the user's viewing range according to some embodiments of the present disclosure.

FIG. 4A illustrates a schematic view of an example of the first real object in the user's viewing range according to some embodiments of the present disclosure. The electronic device is the AR glasses (not shown). The first real object is the left-hand palm. The first gesture is the gesture of the left hand of the user closing as a fist and opening palm toward the electronic device. If the processor 204 recognizes that the user's gesture is the first gesture, the processor 204 controls the image output unit 201 to output the image of the function menu, such that the user sees the function menu being displayed on the left-hand palm of the user through the reflection unit and moving along with the left-hand palm of the user.

The approach of determining that the first real object is within the viewing range of the user may assist the electronic device to algorithmically distinguish between the palm and the back of a hand to improve accuracy of detection result and to further reduce the probability of user's incorrect operations. During the use of the electronic device by the user, the user is unlikely to see the user's palm in front of the user's eyes. However, the gesture of subconsciously looking at the user's palm may not be completely excluded. In this rare case, the function menu may be unintentionally displayed. Outputting the image of the function menu based on the first gesture may further reduce the rate of unintentional operations.

In some embodiments, before the processor 204 controls the image output unit 201 to output the image of the function menu, the processor 204 may also determine a focal point of the user's line of sight. As such, controlling the image output unit 201 by the processor 204 to output the image of the function menu of the electronic device to make the user perceive the function menu being displayed on the first real object may include: if the focal point of the user's line of sight is located on the first real object, the processor 204 controls the image output unit 201 to output the image of the function menu of the electronic device to make the user perceive the function menu being displayed on the first real object.

In other words, only if the user looks at the first real object, the processor 204 then controls the image output unit 201 to output the image of the function menu of the electronic device to make the user perceive the function menu being displayed on the first real object. As such, when the user does not intend to look at the function menu or to perform an operation on the function menu, even if the first real object appears within the viewing range of the user, the function menu will not be displayed. The user's need may be satisfied more accurately. The interference with the user's operation caused by unnecessary displaying of the function menu may be reduced.

In some embodiments, if the focal point of the user's line of sight is not located on the first real object and the first real object is within the viewing range of the user, the processor 204 may also control the image output unit 201 to reduce a display area of the function menu and/or not to display a portion of the content of the function menu. Only if the focal point of the user's line of sight is located on the first real object and the first real object is within the viewing range of the user, the processor 204 may control the image output unit 201 to normally output the image of the function menu.

Controlling the image output unit 201 by the processor 204 to reduce the display area of the function menu may refer to keeping displaying the same content of the function menu while reducing the display area of the function menu or may refer to displaying a minimized image of the function menu. Controlling the image output unit 201 by the processor 204 not to display a portion of the content of the function menu may refer to terminating outputting the content in the function menu that is not related to a first interactive object or the application corresponding to the first interactive object. For example, the processor 204 may control the image output unit 201 to output only the image of a basic configuration menu (e.g., brightness adjustment or volume adjustment).

In some embodiments, after the processor 304 controls the image output unit 201 to output the image of the function menu, the processor 204 may also obtain a first operation on the function menu. The first operation is configured to trigger the first interactive object in the function menu. For example, the first interactive object may be an application icon. The first operation may be an operation of clicking on the first interactive object to start the application corresponding to the first interactive object. The embodiments of the present disclosure do not limit the type of the first operation.

In some embodiments, the first operation may include an operation performed by the user on the function menu using an operation body such as a hand or may include moving a cursor within the viewing range by the user through a hand movement or an eye movement technique to select a first object. The operation is then confirmed by the gesture of an operation body other than the first interactive object or by voice, which is not limited by the present disclosure.

After the first operation is obtained, the processor 204 may perform either of the following two different processes.

In one process, based on the first operation, the processor 204 may control the image output unit 201 to reduce the display area of the function menu and/or not to display a portion of the content of the function menu.

Figure 3C:
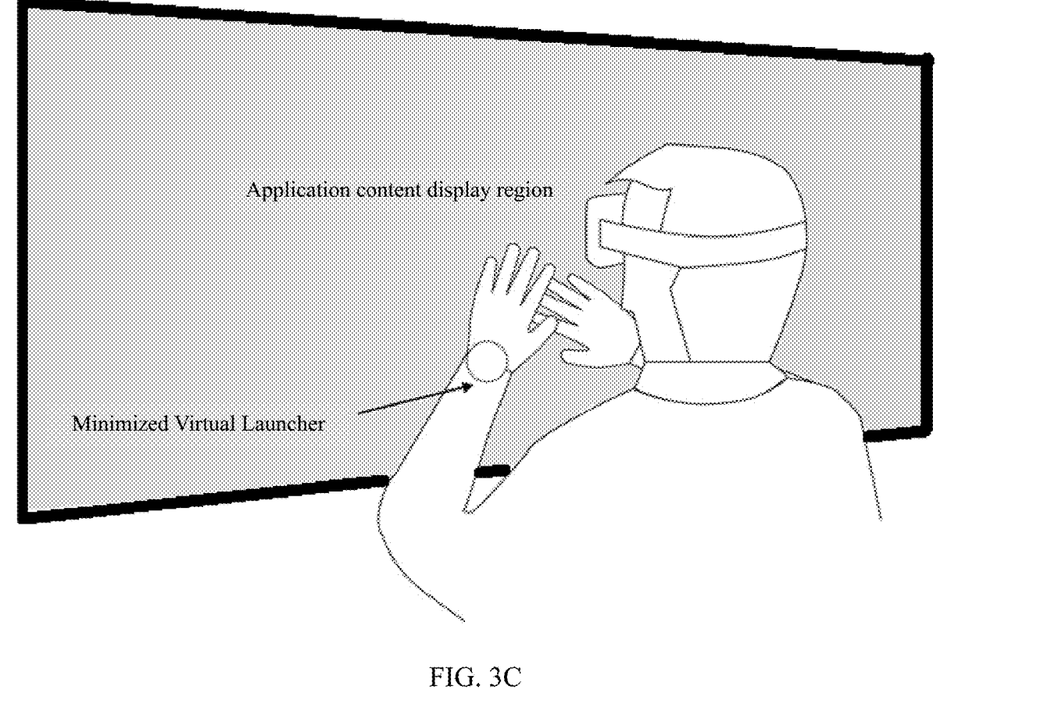
FIG. 3C illustrates a schematic view of an example of a minimized interface of a launcher outputted by the image output unit 201 based on the first operation according to some embodiments of the present disclosure.

FIG. 3C illustrates a schematic view of an example of a minimized interface of a launcher outputted by the image output unit 201 based on the first operation according to some embodiments of the present disclosure. As shown in FIG. 3C, based on the first operation, the processor 204 controls the image output unit 201 to reduce the display area of the function menu and/or not to display a portion of the content of the function menu. In one embodiment, the electronic device is the AR glasses. The first real object is the back of the left-hand wrist of the user. The function menu is the interface of the launcher. The first interactive object is the icon of a first application (not shown). The first application is different from the launcher. The first operation is an operation of clicking on the first interactive object to start the first application (not shown). After the first operation is obtained, because the back of the left-hand wrist is still within the viewing range of the user, based on the first operation, the processor 204 controls the image output unit 201 to output the minimized image of the interface of the launcher to make the user perceive the minimized interface of the launcher being displayed on the back of the left-hand wrist. At the same time, the processor 204 controls the image output unit 201 to output the image of the interface of the first application to make the user perceive the interface of the first application being displayed in the application content display region within the viewing range of the user. The user may perform an operation on the first application in the application content display region. A distance between the application content display region and the user's eyes is greater than a distance between the back of the left-hand wrist of the user and the user's eyes. In this way, the automatically reduced display area of the function menu may not affect the user's operation on the first application. At the same time, it is convenient for the user to open the function menu at any time. The user may click on the minimized function menu to display the function menu in its normal size.

In another process, based on the first operation, the processor 204 may control the image output unit 201 to output the image of a control menu to make the user perceive the control menu being displayed on the first real object. The control menu includes control elements through which the user performs the operation on the content corresponding to the first interactive object. For example, the control menu may include turn-off knobs and parameter setting buttons, etc. The control menu is different from the function menu. For example, the function menu may be the operation interface of the launcher while the control menu may include an operation control element of an application started by clicking on an icon in the function menu. The process is described in detail as follows.

For example, the electronic device is the AR glasses and includes the reflection unit. The first real object is the back of the left-hand wrist of the user. The first interactive object is the icon of the first application. The first application is a three-dimensional navigation software program. The first operation is an operation of clicking on the first interactive object to start the first application. After the first operation is obtained, based on the first operation, the processor 204 may control the image output unit 201 to output the image of the control menu of the first application. Through the reflection unit, the user may see the control menu being displayed on the back of the left-hand wrist. The control menu includes a close button for the first application. From the user's perspective, the application content display region shown in FIG. 3C does not display the content included in the control menu and only displays the three-dimensional navigation map. As such, the three-dimensional navigation map is displayed more clearly and the picture looks more appealing. If the user desires to close the three-dimensional navigation map, the user only needs to click on the close button in the control menu.

In the second process, the user no longer needs to perform any operation on the function menu to display the control menu on the first real object for the content corresponding to the first interactive object. It is more convenient for the user. Further, it will not interfere with the user's observation of the content corresponding to the first interactive object or the user's observation of other real objects.

In some embodiments, after the processor 204 controls the image output unit 201 to output the image of the function menu, the processor 204 may also determine whether the first real object needs to be used for the gesture control or limb control based on the current application scenario of the electronic device. If the processor 204 determines that the first real object needs to be used for the gesture control or limb control based on the current application scenario of the electronic device, the processor 204 may control the image output unit 201 to reduce the display area of the function menu and/or not to display a portion of the content of the function menu, thereby avoiding interfering with the user's gesture control or limb control. In the process of using the first real object by the user for the gesture control or limb control, the first real object needs to be within the viewing range of the user and the function menu with the reduced display area and/or the concealing of a portion of the content moves along with the first real object. That is, the user sees the function menu being displayed persistently on the first real object.

If the user desires to conceal the image of the function menu or the image of the control menu, the user may perform either of the following processes.

In one process, the first real object is forced to leave the viewing area of the user. The image acquisition unit 202 may acquire the object information within the viewing range of the user continually or periodically and may send the acquired object information to the processor 204. If the processor 204 determines that the first real object leaves the viewing range of the user (partially leaving or entirely leaving, not limited by the present disclosure) based on the acquired object information, the processor 204 controls the image output unit 201 to terminate outputting the image of the function menu or the image of the control menu.

In some embodiments, if the first real object is the palm and the image acquisition unit 202 acquires a second gesture, the processor 204 may determine that the first real object leaves the viewing range of the user. The second gesture may be a gesture of flipping the user's hand or a gesture of holding the user's hand as a fist. In this way, the accuracy of determining by the processor that the first real object leaves the viewing range of the user may be improved and the convenience of the user operation may be improved. In some embodiments, if the first real object is the inner side of the wrist, the second gesture may be a gesture of turning the user's wrist from the inner side to the outer side.

In another process, the image acquisition unit 202 may acquire a third gesture. Based on the third gesture, the processor 204 determines that the user desires to conceal the image of the function menu or the image of the control menu and controls the image output unit 201 to terminate outputting the image of the function menu or the image of the control menu. The third gesture may be pre-configured. For example, the third gesture may be a gesture of bending the user's finger toward the electronic device, which is not limited by the embodiments of the present disclosure.

Figure 4B:
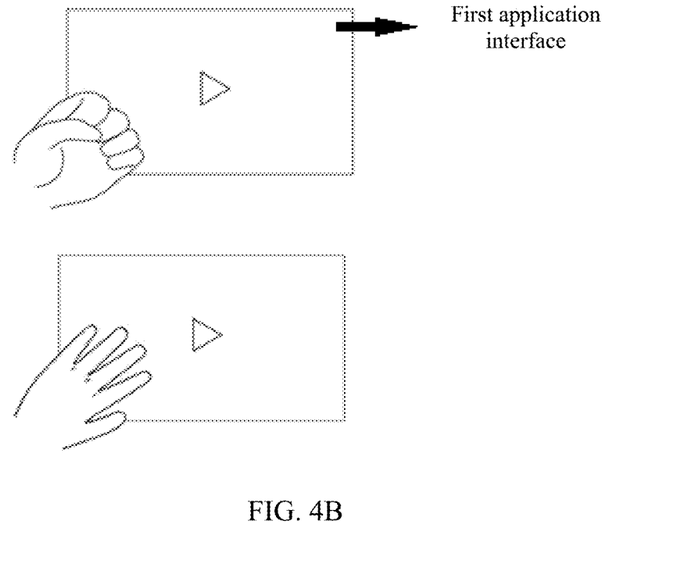
FIG. 4B illustrates a schematic view of an example of concealing the function menu according to some embodiments of the present disclosure.

FIG. 4B illustrates a schematic view of an example of concealing the function menu according to some embodiments of the present disclosure. As shown in FIG. 4B, based on the third gesture, the processor 204 controls the image output unit 201 to terminate outputting the image of the function menu. In one embodiment, the electronic device is the AR glasses (not shown). The first real object is the left-hand palm. The third gesture is a gesture of holding the user's hand as a fist toward the electronic device. The image acquisition unit 202 acquires the user's gesture. The processor 204 recognizes the user's gesture to be the third gesture and then controls the image output unit 201 to terminate outputting the image of the function menu.

The present disclosure provides the display method and the electronic device. From the user's perspective, the operation of opening the function menu or the operation of concealing the function menu is as simple as making the first real object enter or leave the viewing range of the user. It is convenient and easy to use. The user perceives the function menu being displayed on a pre-set first real object rather than being displayed on any real object within the viewing range of the user. Thus, the probability of interfering with the user's observation of the object desired to be observed is substantially reduced. It is convenient for the user to quickly find the function menu, thereby improving the operation efficiency.

Figure 5:
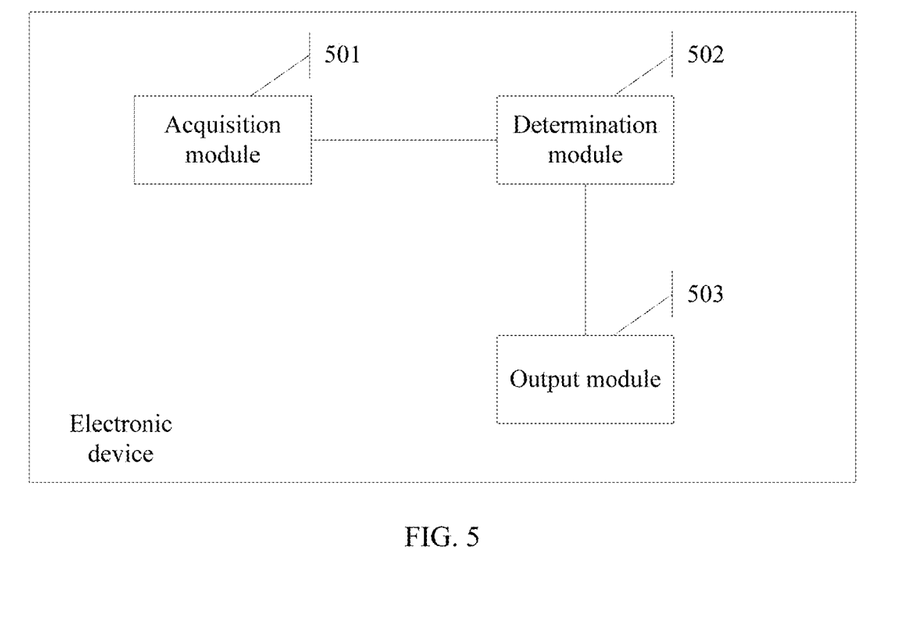
FIG. 5 illustrates a block diagram of another example of the electronic device according to some embodiments of the present disclosure.

FIG. 5 illustrates a block diagram of another example of the electronic device according to some embodiments of the present disclosure. The electronic device shown in FIG. 5 may be the same as or different from the electronic device shown in FIG. 2. As shown in FIG. 5, the electronic device may include: an acquisition module 501 configured to acquire object information within a viewing range of a user, a determination module 502 configured to determine that a first real object is within the viewing range of the user based on the object information acquired by the acquisition module 501, and an output module 503 configured to output an image of a function menu of the electronic device to make the user perceive the function menu being displayed on the first real object. If the determination module 502 determines that the first real object leaves the viewing range of the user, the output module 503 is further configured to terminate outputting the image of the function menu.

In one embodiment, the first real object is a palm. Acquiring the object information within the viewing range of the user by the acquisition module 501 may include: acquiring a first gesture by the acquisition module 501. Determining by the determination module 502 that the first real object is within the viewing range of the user based on the object information acquired by the acquisition module 501 may include: if the first gesture is a gesture of bending and extending a finger toward the electronic device, determining by the determination module 502 that the first real object is within the viewing range of the user.

In one embodiment, after the output module 503 outputs the image of the function menu of the electronic device, the acquisition module 501 is further configured to acquire a first operation on the function menu. The first operation is configured to trigger a first interactive object in the function menu. The output module 503 is further configured to reduce a display area and/or not to display a portion of the content of the function menu based on the first operation.

In one embodiment, after the output module 503 outputs the image of the function menu of the electronic device, the acquisition module 501 is further configured to acquire the first operation on the function menu. The first operation is configured to trigger the first interactive object in the function menu. The output module 503 is further configured to output an image of a control menu to make the user perceive the control menu being displayed on the first real object. The control menu is different from the function menu. The control menu includes control elements through which the user performs the operation on the content corresponding to the first interactive object.

In one embodiment, after the output module 503 outputs the image of the function menu of the electronic device, the determination module 502 is further configured to determine whether the first real object needs to be used for a gesture control. The output module 503 is further configured to reduce the display area of the function menu and/or not to display a portion of the content of the function menu.

In one embodiment, before the output module 503 outputs the image of the function menu of the electronic device, the determination module 502 is further configured to determine a focal point of a line of sight of the user. Outputting by the output module 503 the image of the function menu of the electronic device to make the user perceive the function menu being displayed on the first real object includes: if the focal point of the line of sight of the user is located on the first real object, outputting the image of the function menu to make the user perceive the function menu being displayed on the first real object.

Because the electronic device shown in FIG. 5 is configured to execute the display method shown in FIG. 1, the descriptions of the functions and the implementation processes of various function modules included in the electronic device may refer to the description of the method embodiments and will not be repeated herein.

The present disclosure provides the display method and the electronic device. From the user's perspective, the operation of opening the function menu or the operation of concealing the function menu is as simple as making the first real object enter or leave the viewing range of the user. It is convenient and easy to use. The user perceives the function menu being displayed on a pre-set first real object rather than being displayed on any real object within the viewing range of the user. Thus, the probability of interfering with the user's observation of the object desired to be observed is substantially reduced. It is convenient for the user to quickly find the function menu, thereby improving the operation efficiency.

Those skilled in the art may understand that the partition of various function modules are for illustrative purposes. In practical applications, the previously described functions may be performed by different function units based on actual requirements. That is, the internal structure of the device may be partitioned to different function units to perform the entire or a portion of the previously described functions. The description of operation processes of the system, the device, and the units may refer to the corresponding processes in the previously described method embodiments and will not be repeated herein.

In the embodiments of the present disclosure, the disclosed system, device and method may be implemented differently. For example, the device embodiments are for illustrative purposes. The partition of the modules or units are merely a logical function partition. Actual implementation may be different. For example, one or more units or components may be combined or integrated into another system or certain features may be omitted or may not be executed. Moreover, coupling or direct coupling or communication connections as displayed or discussed may be achieved through certain interfaces. Indirect coupling or communication connections between devices or units may be electrical, mechanical or in other forms.

The units described as separate components may or may not be physically separated and the components displayed as units may or may not be physical units, that is, may be co-located or distributed in a plurality of network units. Some or all the units may be selected according to actual needs to achieve the purpose of the technical solutions in the present disclosure.

In addition, the function units in the embodiments of the present disclosure may be integrated into one single processing unit or may be physically separated individual units. Alternatively, two or more units may be integrated into one unit. The integrated units may be implemented in hardware or software.

If the integrated units are implemented in software, sold and used as a standalone product, the software may be stored in a computer readable storage medium. Based on this understanding, the entire or a portion of the technical solution of the present disclosure, which is innovative as compared to the existing technology, may exist in the form of software. The computer software product stored in the storage medium includes a plurality of instructions that can be executed by a computer equipment (e.g., a personal computer, a server, or a network device) or a processor to perform some or all method embodiments of the present disclosure. The storage medium includes a universal serial bus (USB) flash disk, a portable hard disk, a read-only memory (ROM), a random-access memory (RAM), a magnetic disk, an optical disk, or other suitable medium for storing the program code.

For example, the computer program instructions corresponding to the display method of the present disclosure may be stored in the optical disk, the hard disk, or the ISB flash disk. The computer program stored in the storage medium for the display method of the present disclosure may be retrieved by the electronic device. When being executed, the computer program includes the following process. Object information within a viewing range of a user is acquired. Based on the object information, a first real object within the viewing range of the user is determined. An image of a function menu of the electronic device is outputted, such that the user perceives the function menu being displayed on the first real object. If the first real object is determined to leave the viewing range of the user, outputting the image of the function menu is terminated.

In one embodiment, executing the computer instructions stored in the storage medium corresponding to the step of acquiring the object information within the viewing range of the user includes: acquiring a first gesture. Executing the computer instructions stored in the storage medium correspond to the step of determining that the first real object is within the viewing range of the user based on the object information includes: if the first gesture is a gesture of bending and extending a finger toward the electronic device, determining that the first real object is within the viewing range of the user.

In one embodiment, executing the computer instructions stored in the storage medium subsequent to the step of outputting the image of the function menu of the electronic device includes: acquiring a first operation on the function menu, where the first operation triggers a first interactive object in the function menu; and based on the first operation, reducing a display area of the function menu and/or concealing a portion of the content of the function menu.

In one embodiment, executing the computer instructions stored in the storage medium subsequent to the step of outputting the image of the function menu of the electronic device includes: acquiring the first operation on the function menu, where the first operation triggers the first interactive object in the function menu; and based on the first operation, outputting an image of a control menu to make the user perceive the control menu being displayed on the first real object, where the control menu is different from the function menu and the control menu include control elements through which the user performs the operation on the content corresponding to the first interactive object.

In one embodiment, executing the computer instructions stored in the storage medium subsequent to the step of outputting the image of the function menu of the electronic device includes: determining whether the first real object needs to be used for a gesture control; and reducing the display area of the function menu and/or concealing a portion of the content of the function menu.

In one embodiment, executing the computer instructions stored in the storage medium prior to the step of outputting the image of the function menu of the electronic device includes: determining a focal point of a line of sight of the user. Executing the computer instructions stored in the storage medium corresponding to the step of outputting the image of the function menu of the electronic device to make the user perceive the function menu being displayed on the first real object includes: if the focal point of the line of sight of the user is located on the first real object, outputting the image of the function menu of the electronic device to make the user perceive the function menu being displayed on the first real object.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display method applied to an electronic device, comprising:
   acquiring object information within a viewing range of a user;
   based on the object information, determining that a first real object is within the viewing range of the user;
   determining a focal point of a line of sight of the user;
   in response to the focal point being located on the first real object, outputting an image of a function menu of the electronic device to display the function menu on the first real object; and
   in response to the first real object leaving the viewing range of the user, stopping outputting the image of the function menu.

2. The method according to claim 1, wherein:
   the first real object is a palm;
   acquiring the object information within the viewing range of the user includes acquiring a first gesture information; and
   determining that the first real object is within the viewing range of the user based on the object information includes: in response to the first gesture information is a gesture of bending and extending a finger toward the electronic device, determining that the first real object is within the viewing range of the user.

3. The method according to claim 1 further including:
   acquiring a first operation on the function menu, wherein the first operation triggers a first interactive object in the function menu; and
   reducing a display area of the function menu or concealing a portion of the content of the function menu.

4. The method according to claim 1 further including:
   acquiring a first operation on the function menu, wherein the first operation triggers the first interactive object in the function menu; and
   outputting an image of a control menu to display the control menu on the first real object, wherein the control menu is different from the function menu and the control menu includes control elements through which the user performs the operation on the content corresponding to the first interactive object.

5. The method according to claim 1 further including:
   determining whether the first real object needs to be used for a gesture control; and
   reducing a display area of the function menu or concealing a portion of the content of the function menu.

6. An electronic device, comprising:
   an image acquisition unit configured to acquire object information within a viewing range of a user;
   a memory configured to store instructions;
   a processor configured to determine that the first real object is within the viewing range of the user based on the object information, and focal point of a line of sight of the user; and
   in response to the focal point being located on the first real object, an image output unit configured to output an image of a function menu of the electronic device to display the function menu on the first real object, and in response to the processor determining that the first real object has left the viewing range of the user, to terminate outputting the image of the function menu.

7. The electronic device according to claim 6, wherein:
   the first real object is a palm;
   acquiring the object information within the viewing range of the user by the image acquisition unit includes: acquiring a first gesture; and
   determining that the first real object is within the viewing range of the user based on the object information by the processor includes: in response to the first gesture being a gesture of bending and extending a finger toward the electronic device, determining that the first real object is within the viewing range of the user.

8. The electronic device according to claim 6, wherein:
   the processor is further configured to acquire a first operation on the function menu, the first operation triggering a first interactive object in the function menu; and
   the image output unit is further configured to reduce a display area of the function menu or concealing a portion of the content of the function menu.

9. The electronic device according to claim 6, wherein:
   the processor is further configured to acquire a first operation on the function menu, the first operation triggering a first interactive object in the function menu; and
   the image output unit is further configured to output an image of a control menu to display the control menu on the first real object, the control menu being different from the function menu and the control menu including control elements through which the user performs the operation on the content corresponding to the first interactive object.

10. The electronic device according to claim 6, wherein:

the processor is further configured to determine whether the first real object needs to be used for a gesture control; and the image output unit is further configured to reduce a display area of the function menu or concealing a portion of the content of the function menu.

* * * * *